United States Patent
Armstrong et al.

(10) Patent No.: US 7,476,436 B2
(45) Date of Patent: Jan. 13, 2009

(54) ARTIST'S CRADLE

(76) Inventors: Floyd Armstrong, #9 - 2260 Benvoulin Road, Kelowna, British Columbia (CA) V1W 4W9; Douglas Enns, 345 Bach Road, Kelowna, British Columbia (CA) V1X 2K8

( * ) Notice: Subject to any disclaimer, the term of this patent is extended or adjusted under 35 U.S.C. 154(b) by 160 days.

(21) Appl. No.: 11/599,324

(22) Filed: Nov. 15, 2006

(65) Prior Publication Data
US 2007/0123125 A1 May 31, 2007

Related U.S. Application Data (60) Provisional application No. 60/736,233, filed on Nov. 15, 2005.

(51) Int. Cl.
*B32B 3/02* (2006.01)
(52) U.S. Cl. .......................... 428/192; 40/700; 40/768; 156/322
(58) Field of Classification Search ................. 428/192; 40/768, 700; 156/322
See application file for complete search history.

(56) References Cited

U.S. PATENT DOCUMENTS

| | | | |
|---|---|---|---|
| 1,624,091 A | 5/1927 | Colbert et al. |
| 1,923,483 A | 8/1933 | Glenn |
| 2,580,230 A | 12/1951 | Kunze et al. |
| 2,622,991 A | 12/1952 | Sturm |
| 2,681,527 A | 6/1954 | Sundt |
| 3,230,184 A | 1/1966 | Alford |
| RE28,682 E | 1/1976 | Hoey |
| 4,044,188 A | 8/1977 | Segal |
| 4,065,596 A | 12/1977 | Groody |
| 4,207,366 A | 6/1980 | Tyler |
| 4,269,884 A | 5/1981 | DellaVecchia et al. |
| 4,365,436 A | 12/1982 | Ritchey |
| 4,397,707 A | 8/1983 | Dawdy |
| 4,828,896 A | 5/1989 | Fanti |
| 4,857,386 A | 8/1989 | Butters et al. |
| 4,902,577 A | 2/1990 | Butters et al. |
| 4,957,805 A | 9/1990 | Biggs et al. |
| 5,044,957 A | 9/1991 | Kuranaga |
| 5,360,664 A | 11/1994 | Hamm |
| 5,416,142 A | 5/1995 | Bush et al. |
| 5,614,285 A | 3/1997 | Gardill |
| 5,721,041 A | 2/1998 | Baratto |
| 6,107,406 A | 8/2000 | Bimbrich et al. |
| 6,168,438 B1 | 1/2001 | Leonard et al. |
| 6,350,496 B1 | 2/2002 | Haftvani et al. |
| 6,423,379 B1 | 7/2002 | Ewing |
| 6,428,881 B1 | 8/2002 | Zucker |
| 6,568,938 B1 | 5/2003 | Prince et al. |
| 6,663,143 B2 | 12/2003 | Zirker |
| 6,694,682 B2 | 2/2004 | Fanti |
| 6,843,177 B2 | 1/2005 | Ellis, II |
| 6,908,954 B2 | 6/2005 | Orekhov |
| 6,916,527 B2 | 7/2005 | Ikegawa et al. |
| 6,920,712 B2 | 7/2005 | Chaimberg |

*Primary Examiner*—Alexander Thomas
(74) *Attorney, Agent, or Firm*—Antony C. Edwards (57) ABSTRACT

An artist's cradle includes a sheet of rigid plastic having a paintable surface on at least one planar surface thereof and a rigid base frame mounted to the underside of the sheet. The sheet is substantially neutral or neutral alkali ph and treated with a heat treatment around at least a periphery of the underside of the sheet. The heat treatment includes heat oxidizing the periphery using a heat source. The rigid frame is bonded by an adhesive to the periphery of the sheet following the heat treatment.

21 Claims, 11 Drawing Sheets

ARTIST'S CRADLE

CROSS REFERENCE TO RELATED APPLICATION

This application claims priority from U.S. Provisional Patent Application No. 60/736,233 filed Nov. 15, 2005 entitled Artist's Cradle.

FIELD OF THE INVENTION

This invention relates generally to surfaces and materials used by artists for painting and drawing, and to improvements in same.

BACKGROUND OF THE INVENTION

This invention relates to artist's painting surfaces and in particular to neutral pH acidity and structurally stable surfaces that are not hydrophilic and tend to be hydroscopic in nature, maintaining their dimensional stability regardless of humidity levels that they are exposed to over time. The invention further relates to methods of creating structurally rigid painting surface wherein a rigid planar member having the paintable surface thereon is combined with a rigid frame or structure in order to minimize flexure of the paintable surface, in order to maintain the integrity and life of the paint applied to the surface.

It has been well documented that in the art materials field, practices that were used commonly throughout the 1600's, are still being used today. This is evident especially within the painting supports used by the artist's of today, most of which are still being manufactured from traditional, cellulose-based materials. Cellulose-based wood frames and canvas painting surfaces are sponge like in nature and can swell and contract substantially with varying atmospheric humidity. Notwithstanding the inherent weaknesses of these materials, few attempts have been made within the art field to embrace the modern, technological alternatives that have been proven to be more permanent, stable and reliable, after decades of use.

The ideal artist's support should have qualities that won't shrink or swell excessively with the atmospheric moisture content, such as traditional canvas and paper supports are prone to doing. This type of "breathing" may be harmful to paintings on cotton and linen. The ideal support also should not stretch or warp, a common problem within the conventional cellulose-based materials that leads to cracking of the layers of paint within the paintings themselves. The support should also be able to withstand mechanical impacts, so that dropping the support, or having things dropped on it, should result in only minimal damage to the painting. Finally, the support should provide sufficient physical and chemical bonding with the paint medium to ensure lasting adhesion.

A number of modern alternative materials and their potential use as painting surfaces were discussed in the technical article "Answers" by Rhett Lucas in the June 1995, Volume 12 Number 6 edition of "The Artist's Magazine" (ISSN 0741-3351). Lucas discusses the use of Aluminum Sheet, Acrylonitrile Butadiene Styrene (ABS) Sheet, and modern Textiles made of synthetic fabrics such as Nylon, Orlon, and others. He suggests that ABS sheet is "millennially permanent" due to the fact that it does not expand or contract much with variations in humidity and temperature. Lucas also indicates that "ABS is modestly flexible, but can't warp, always returning to flat after flexing". In practical application flexing of a painting surface induces stress in the dried paint on the surface.

Opus Framing and Art Supplies of Vancouver, British Columbia, Canada produces a cradled panel, which is a painting support made of a piece of wood that has had other narrower pieces of wood glued flush to the back edge. This process creates extra support or a "cradle" for the painting surface that adds extra depth and dimension. The wood surface may be painted onto directly or have a canvas or other medium stretched over it, as published in the Opus Visual Arts Newsletter Issue No. 195, Jan. 2-Jan. 31, 2005. The problem with a wooden surface is that it is hydrophilic and will absorb and release moisture depending on the atmospheric humidity that it is exposed to, which in turn will affect the dimensional stability of the surface, particularly at the molecular level where the paint bond with the surface is stressed and strained due to humidity induced change.

In the prior art applicants are aware of the following patents regarding utilizing plastics for painting surfaces:

U.S. Pat. No. 6,428,881 titled "Matboard/Backing Board and Methods of Manufacture and Use", issued to Zucker on Aug. 6, 2002, describes mat boards and backing boards that are buffered to a pH greater than 7.0 and having as an outer layer a vapor barrier and protective material such as PET, PBT, co-PBT, co-PET and mixtures thereof, as well as methods for making and using such boards, claiming a board comprising a layer of matboard and/or backing board buffered to a pH greater than 7.0 and an outer layer that is a protective layer and or vapor barrier. Essentially Zucker teaches various methods of laminating materials to achieve a pH neutral surface using plastics for the outer layer. This does not address maintaining a flexural stability for the paintable surface.

U.S. Pat. No. 6,168,438 titled "Method of Creating Vivid Paintings Using Clear Canvas", issued to Leonard et al. on Jan. 2, 2001, teaches a method of creating vivid paintings using a clear or translucent canvas, which includes placing the canvas on top of an image to be reproduced and tracing outline and highlight colors from the image onto the front side of the canvas, the actual colours are then applies to the back side of the canvas with a clear coating applied to the front.

U.S. Pat. No. 4,857,386 titled "Inkable Sheet", issued to Butters et al. on Aug. 15, 1989, describes an inkable sheet comprising a base sheet of plastic such as PET film with a surface layer of ink-absorbent resin made of vinyl pyrrolidone polymer and a acrylic or methacrylic polymer. This does not address maintaining a flexural stability for the paintable surface.

U.S. Pat. No. 4,065,596 titled "Artist's Board" issued to Groody on Dec. 27, 1977, describes a laminated artist's board comprised of a rear substantially rigid backer, a front paintable member in the form of a plastic coated paper, cotton duck or linen sheet, and an intermediate flexibly resilient member wherein the range of hardness of the combined front and intermediate members is such that pressure applied on the paintable member with a brush will produce a dent of limited depth that will recover substantially instantaneously so that the artist can retain his techniques and habits of painting on a canvas. The board comprises of a front member of fibrous material consisting of paper, cotton duck or linen, said fibrous material having a plastic paintable surface thereon consisting of polyethylene, polypropylene, acrylic, vinyl or epoxy resins and an intermediate flexibly resilient member consisting of rubber, vulcanizates of acrylic elastomers or foamed plastic. This does not address maintaining a flexural stability for the paintable surface.

U.S. Pat. No. 1,923,483 Method of Making an Artist's Mat issued to Glenn on Aug. 22, 1933, teaches a method which consists of laying a paste of mineral earth on the upper face of a flat backing sheet of paper board, drying the paste thereafter, jogging the backing sheet to condense the paste, removing the upper portion of the dried paste to form a substantially flat face and leave a relatively thin layer of dense material on the backing sheet, etching the face of the backing sheet to form a matrix, and forming a stereotype in the type metal directly from the matrix. Again this does not address either the hydrophilic problem of the materials used, or the problem of maintaining a flexural stability for the paintable surface.

SUMMARY OF THE INVENTION

The present invention serves to mimic the conventional artist canvas, so that any artist working "plein air" or otherwise, can use a standard artist's easel while painting on the ABS cradle panel, which substantially eliminates panel movement due to changes in humidity as seen in conventional painting canvas, while also eliminating any flexing in the ABS panel itself. This is accomplished by structurally fixing a sheet of ABS to a frame constructed of Polyester Resin, Metal, Wood, or other for which the preferred embodiments of Polyester Resin cradle base, Wooden Cradle Base and the methods of making the ABS Cradle Panel are taught here. The ABS cradle panel may also be etched or carved into as well as painted on.

In the present invention artist's cradle panels are composed of a sheet of ABS, of which one surface will be paintable, and the second, opposite, surface has a frame or cradle base bonded to it. The use of ABS thermoplastics for the panels is advantageous, being millennially permanent. That is, during the normal passage of time, ABS does not deteriorate. Further, ABS may flex slightly, but returns to planar. ABS panels are also quite strong, requiring a lot of force to deform or break them, far in excess of what current art supports within the art materials market, offer. ABS doesn't splinter, crack or chip, such as wood products do and within the cradle panel version itself, the edges have been beveled, to inhibit checking or bubbling of the paint along the edges of the painted surface. ABS also is inert in water, allowing for slight expansion/contraction factors, which are minor when compared to traditional cellulose-based art supports.

The artist's cradle according to the present invention reduces or eliminates flexing of the ABS panel itself. The cradle panel allows an artist working "plein air" or otherwise, to use a standard artist's easel while painting with the ABS cradle panel.

DETAILED DESCRIPTION OF EMBODIMENTS OF THE INVENTION

Figure 3:
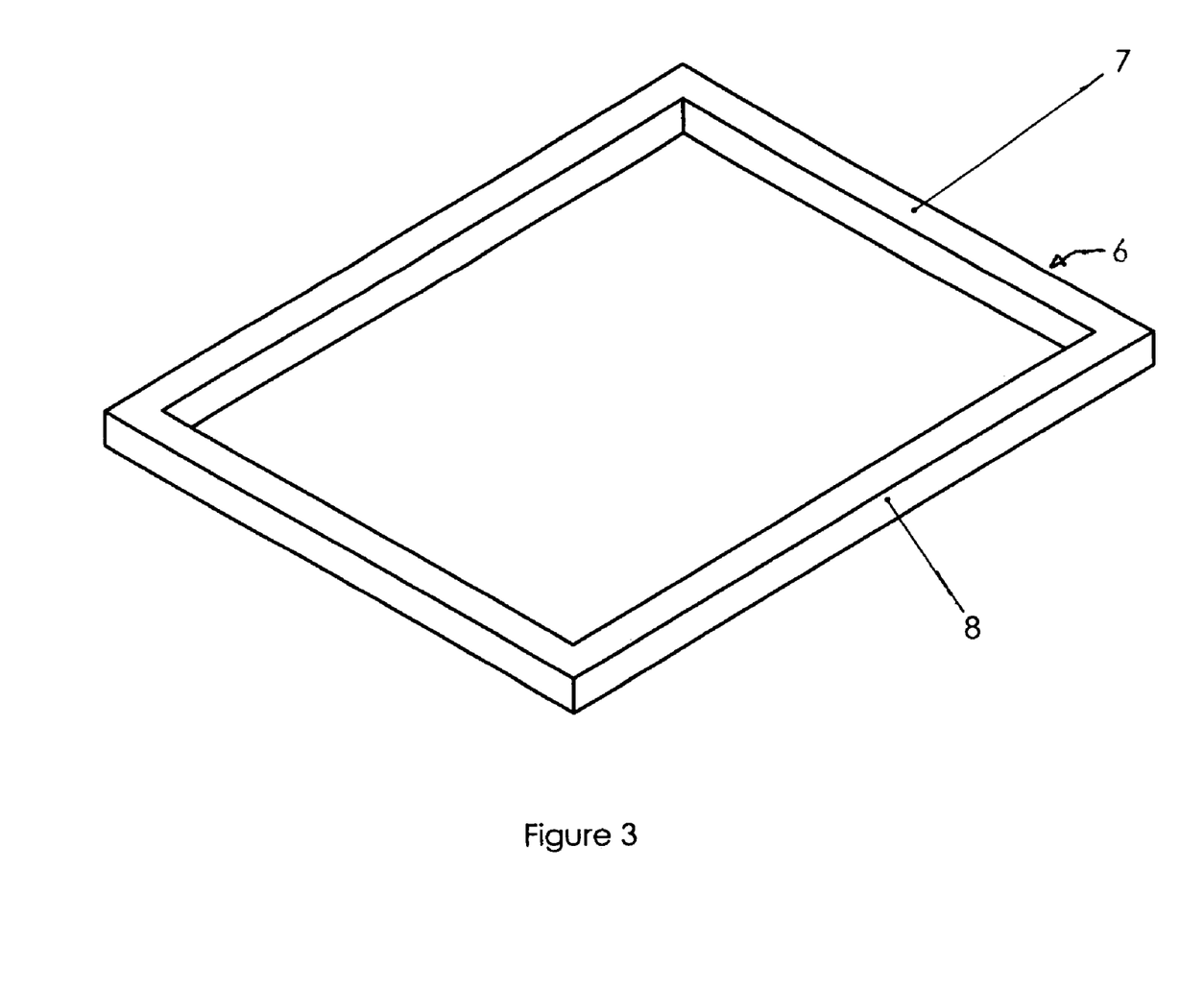
FIG. 3 is, in front perspective view, a cradle base made of wood, polyester, metal, or other.

With reference to the drawings wherein similar characters of reference denote corresponding parts in each view, the artist's cradle according to the present invention is an artist's painting surface having sheet 1 assembled into a cradle panel where the sheet 1 is supported on a frame or base 6 that provides flexural stability to the sheet. The sheet is advantageously made of ABS. The stabilizing frame or cradle base 6 (referred to interchangeably herein) as shown in FIG. 3 is bonded to the non-painted, that is, underneath surface, side 3, of sheet 1. The method for making the artist's cradle starts by selecting a color and finish of ABS sheet of desired thickness, such as for example in the range ⅛ to ¼ inches thickness, and cutting the sheet to size, and fiber, selecting the material to make frame 6 from. Frame 6 may be made of treated wood for example coated so as to be hydroscopic and preferably straight grained, polyester resin, metal or other stiff preferably hydroscopic material. Applicants have successfully used sheets having dimensions of 20×42 inches, and sheets as large as 36×48 inches may also work so long as the sheet is sufficiently thick and the frame sufficiently dimensioned so as to be rigid. For wood for example, a frame member may be made of hemlock and have a cross-sectional dimension of ¾×1½ inches.

Figure 1:
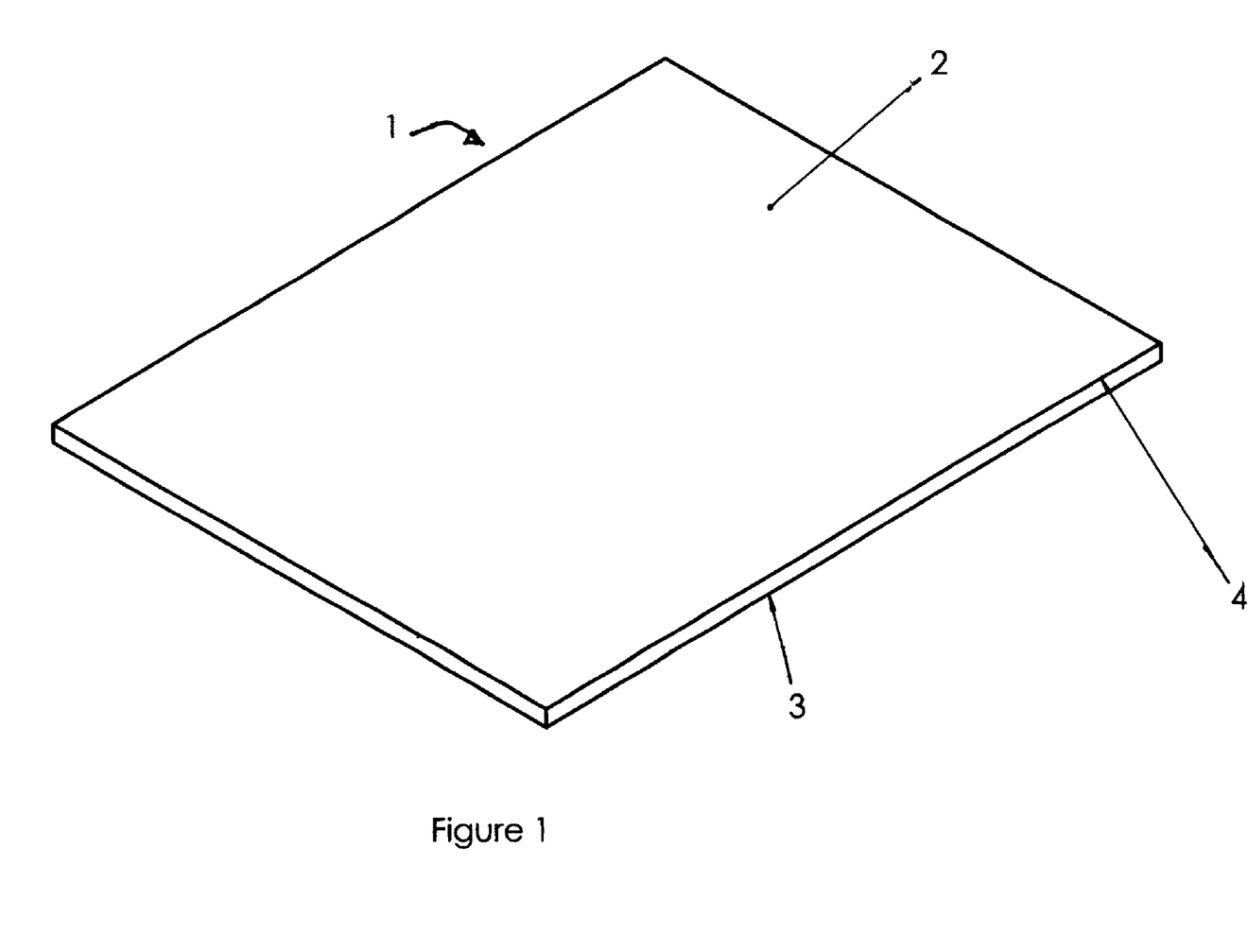
FIG. 1 is, in front perspective view, a sheet of ABS.

After sizing sheet 1, the painting surface 2 is selected if texture differs on opposite sides of the sheet, and the painting surface covered with protective paper and "painter's tape" to prevent contamination during the assembly process, so that the surface remains clean for subsequent painting using either acrylic or oil paints, or graphite drawing.

Figure 2:
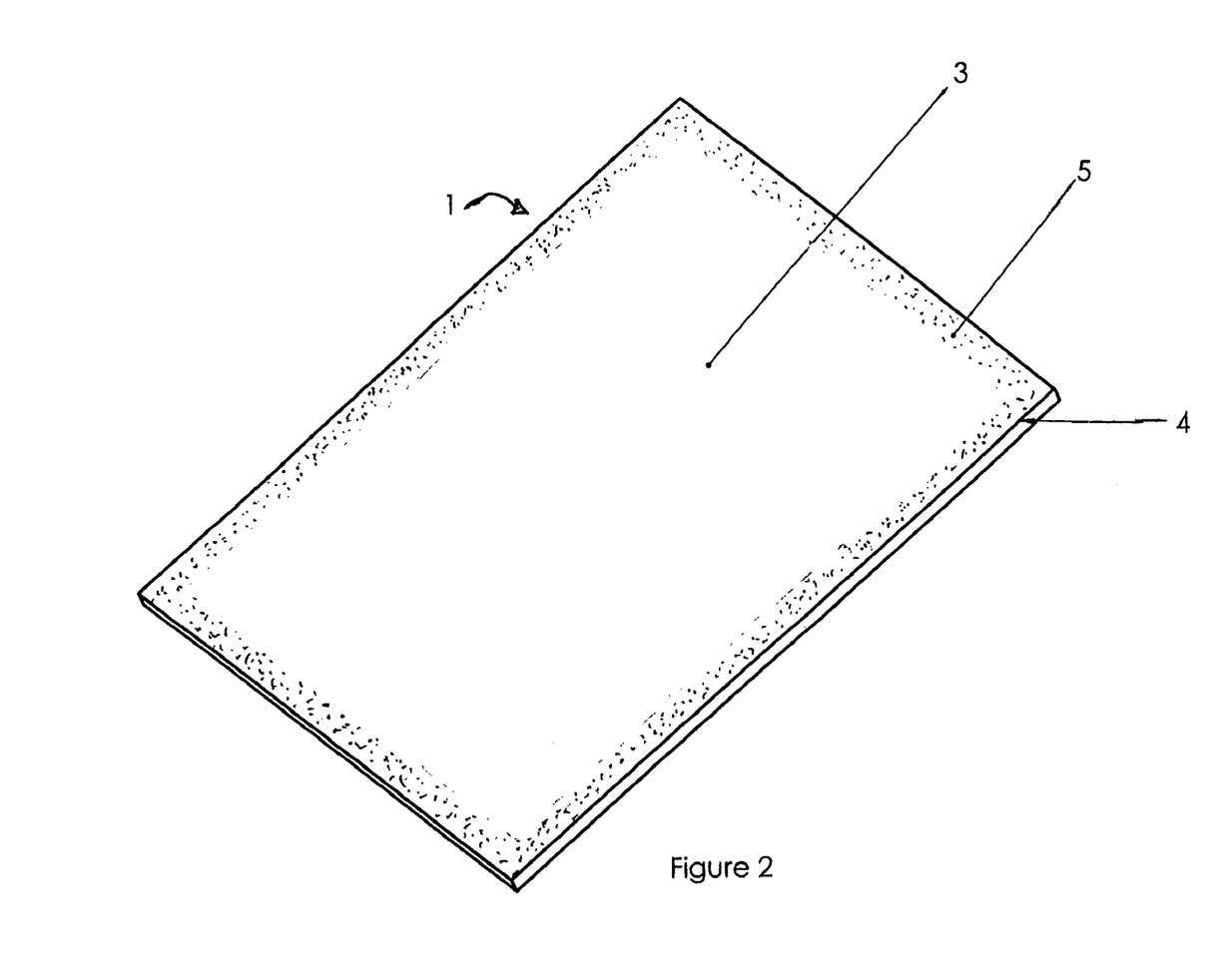
FIG. 2 is, in rear perspective view, as sheet of ABS with bonding surfaces sanded.
Figure 4:
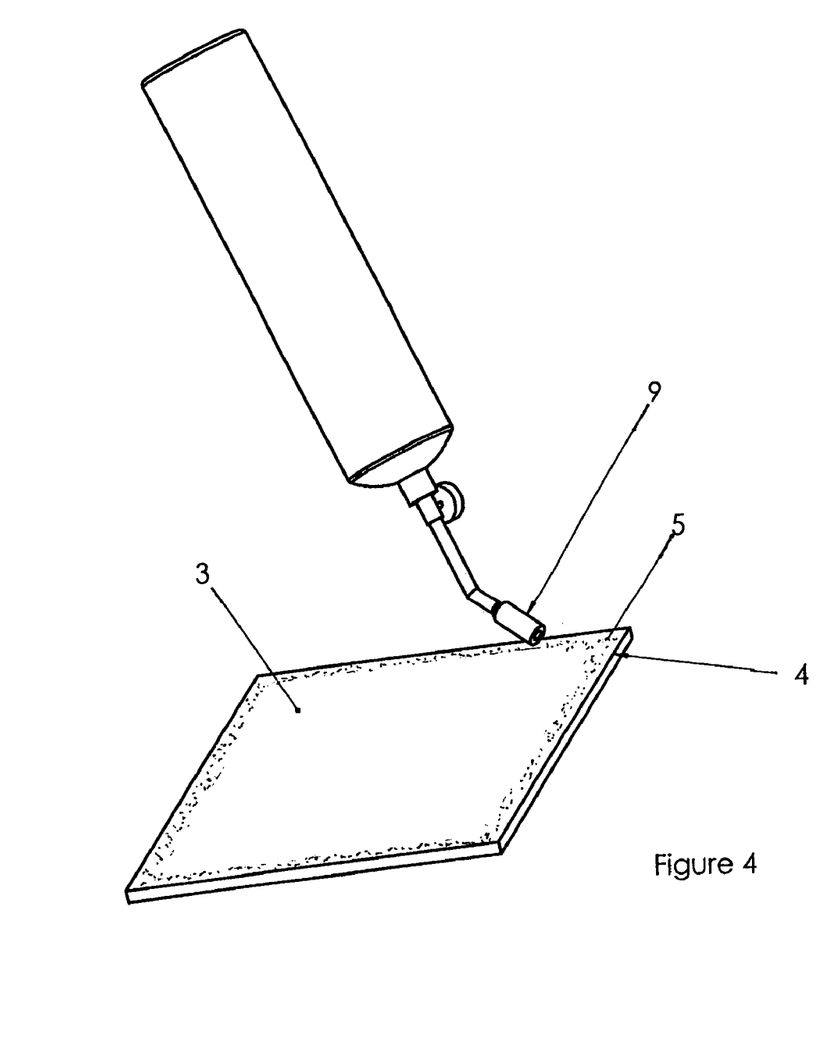
FIG. 4 is, in rear perspective view, a sheet of ABS with bonding surfaces sanded and being heat oxidized.
Figure 5:
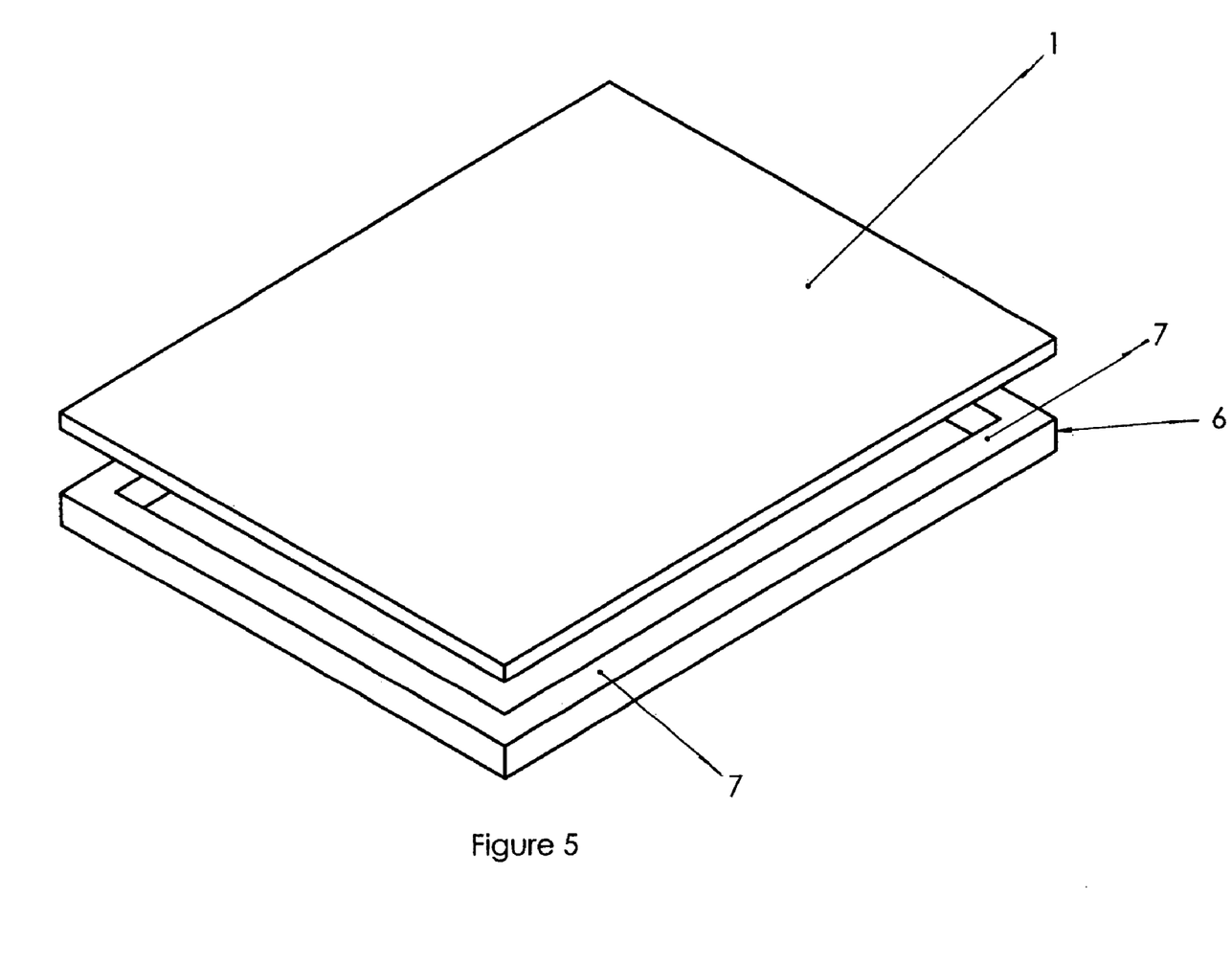
FIG. 5 is, in front perspective view, an ABS cradle panel in exploded view.
Figure 6:
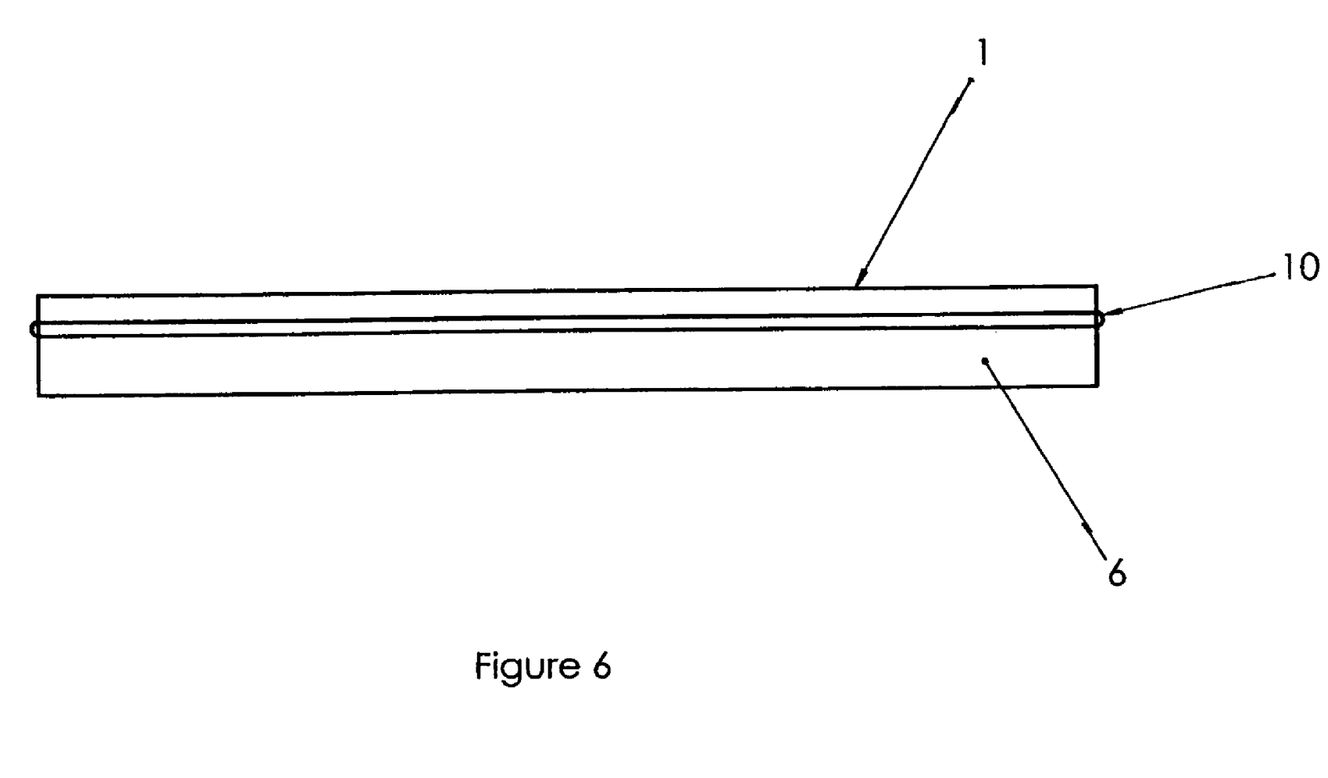
FIG. 6 is, in side view, an ABS cradle panel in assembled view with epoxy bead at bond zone.
Figure 7:
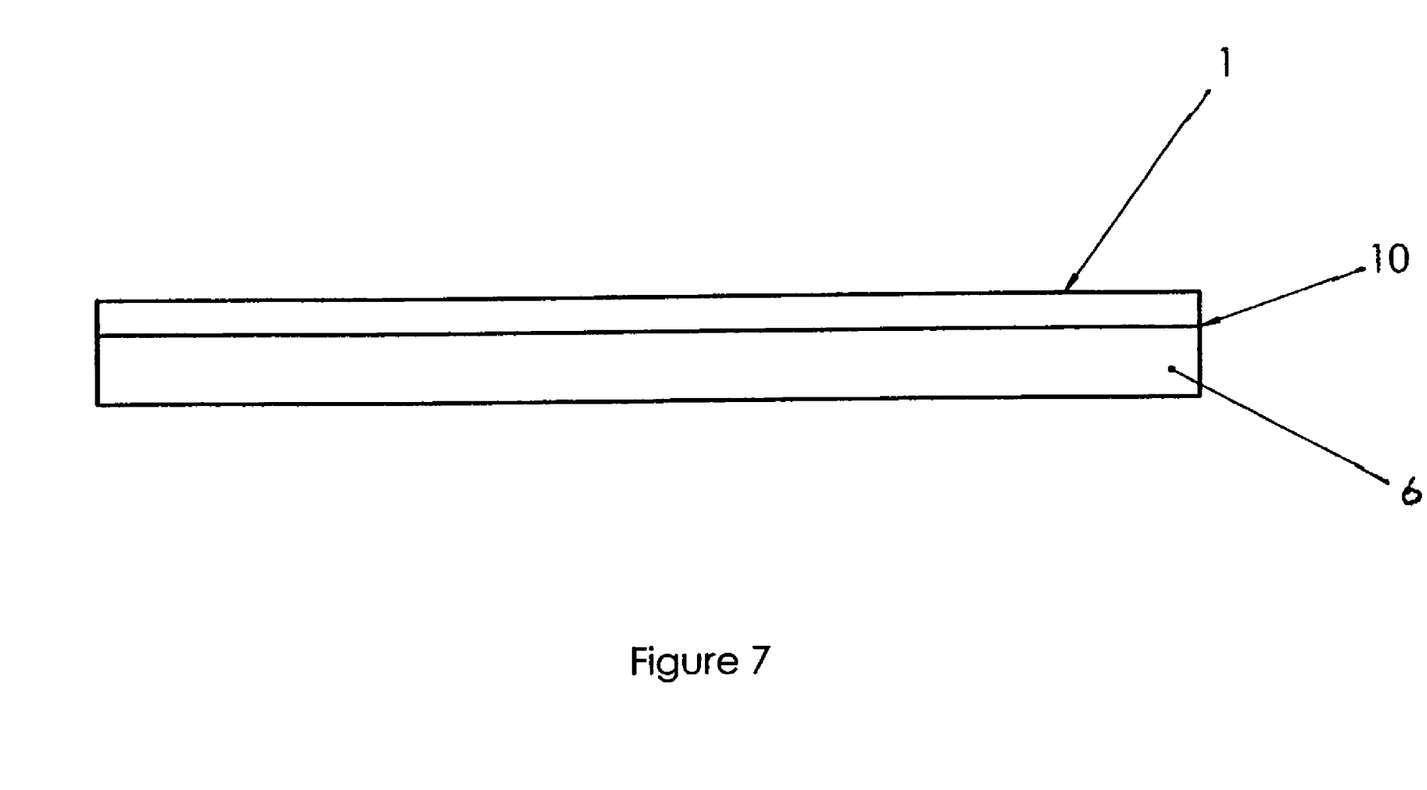
FIG. 7 is, in side view, an ABS cradle panel with the epoxy bead sanded off.
Figure 8:
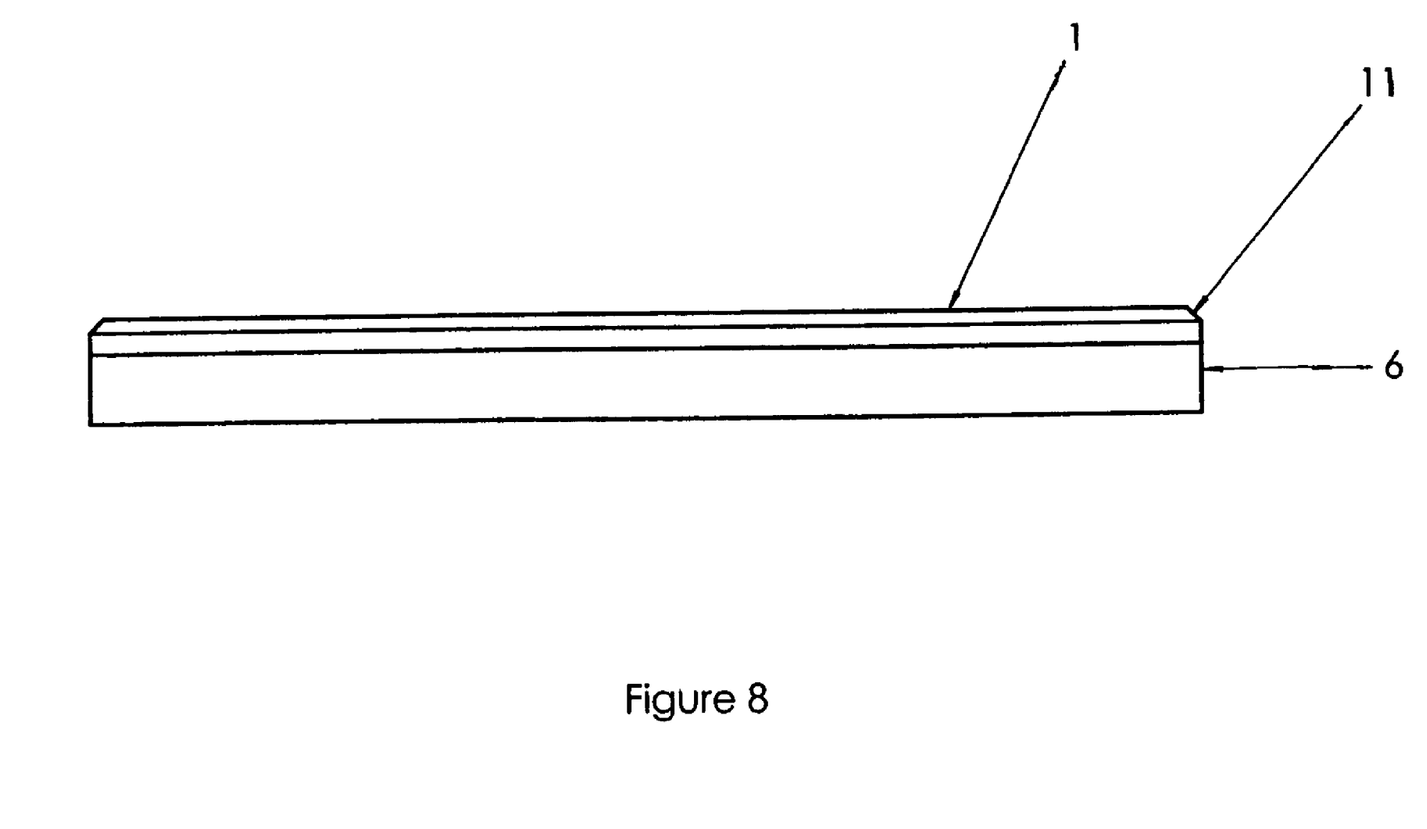
FIG. 8 is, in side view, an ABS cradle panel with sheet edge beveled.
Figure 9:
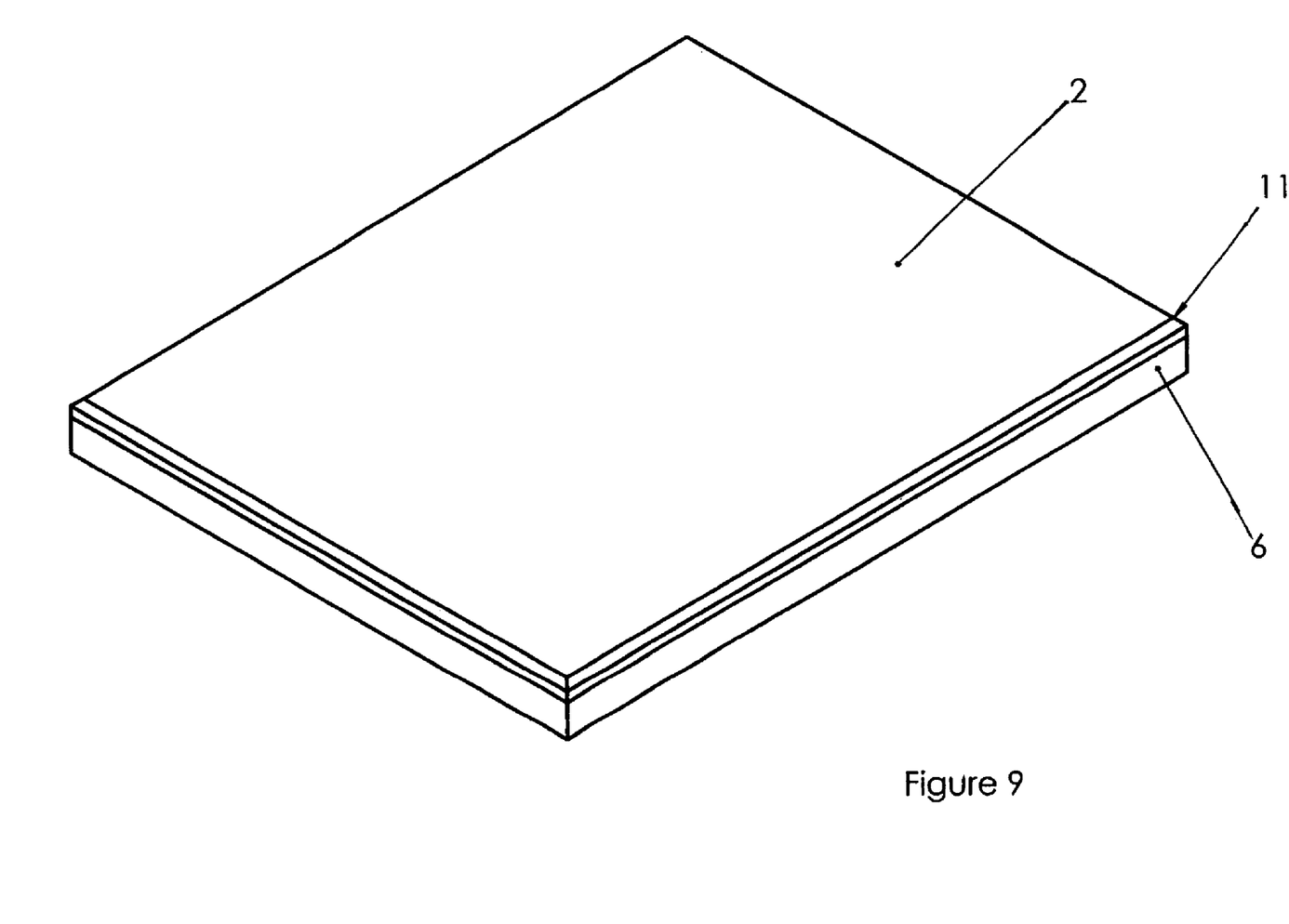
FIG. 9 is, in front perspective view, an assembled ABS cradle panel with beveled sheet edge.
Figure 10:
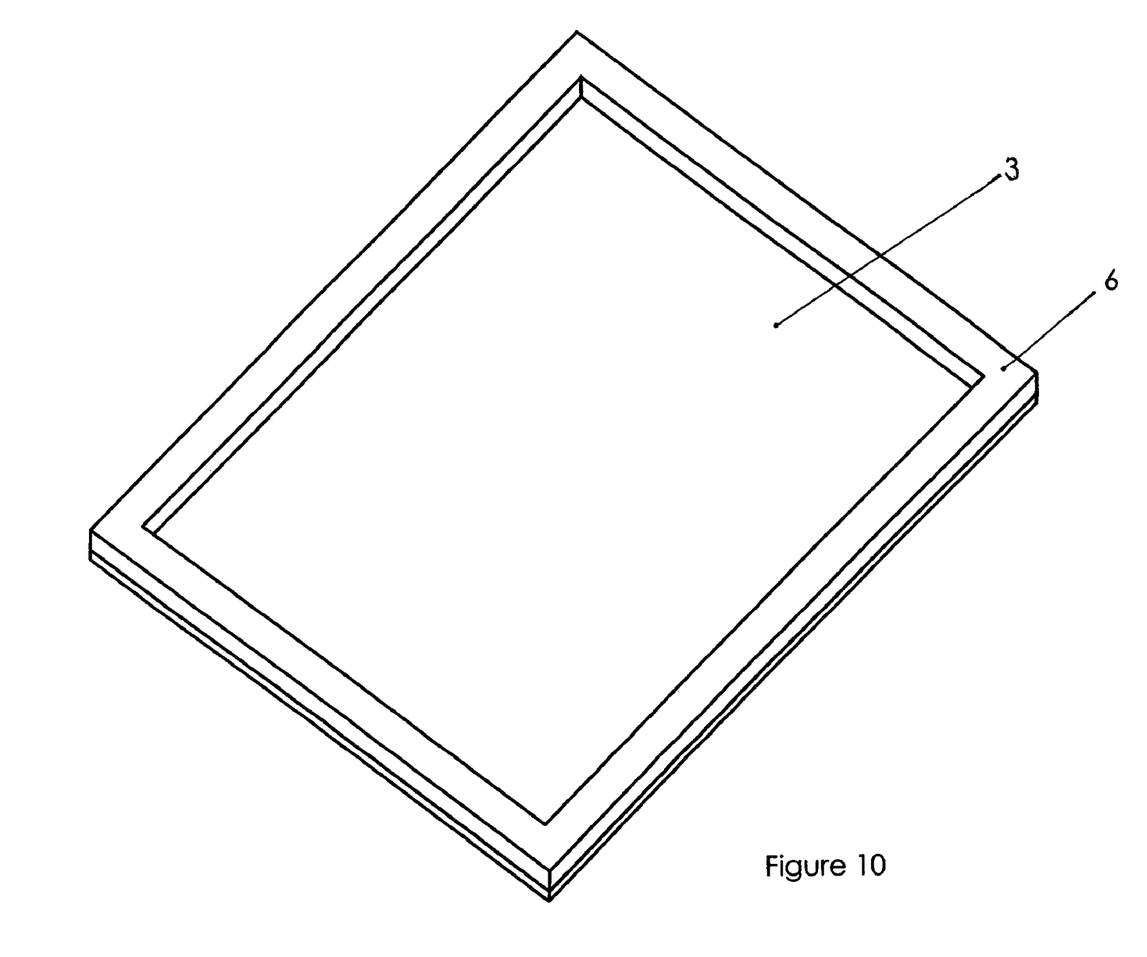
FIG. 10 is, in rear perspective view, an assembled ABS cradle panel with beveled sheet edge.
Figure 10A:
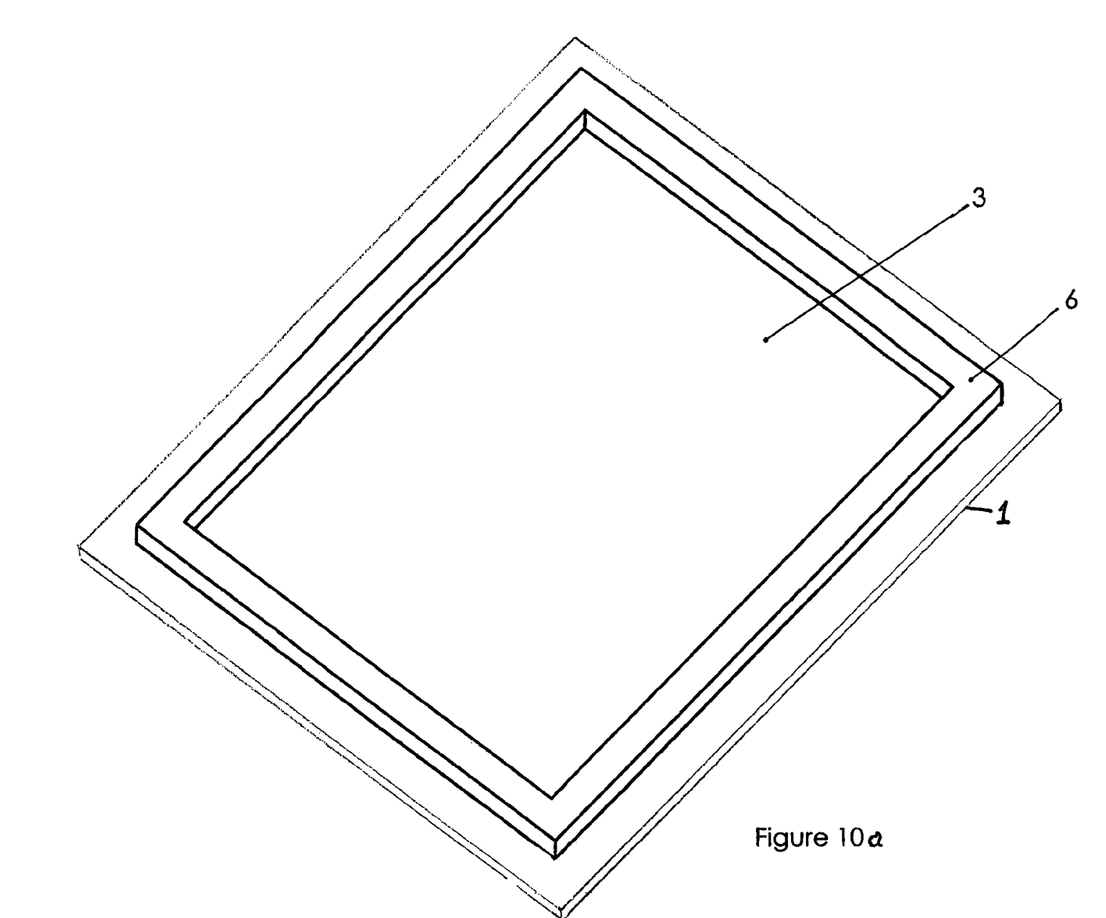
FIG. 10a is, in rear perspective view, an alternative embodiment of the artist's cradle according to the present invention wherein the base frame is recessed in from the edges of the panel sheet.

The main problem with bonding the frame material to the ABS sheet is that the frame typically will not properly adhere unless it is being welded to the ABS using a solvent. Even such a weld may come apart with flexing of the ABS panel. In order to bond wood, polyester or metal to the ABS sheet 1, the sheet should be prepared by first roughening the surface to be bonded using a sanding block, for example with 60-grit sandpaper, followed by sanding with 100-grit sandpaper. Once the circumferential bonding surface 5 such as shown in FIG. 2 has been sanded it should be oxidized in order for the epoxy to properly adhere to the ABS. This may be accomplished as shown in FIG. 4 by flame such as with a propane torch 9 passed quickly over the bonding surface 5, ensuring that the flame from the torch does not melt or discolor the ABS surface. Failure to adequately oxidize the bonding surface may result in the epoxy failing to maintain a proper long-lasting bond between the ABS sheet and the wood, metal, polyester or other material of cradle base 6.

The bonding surface 7 of the cradle base 6 is next selected and lightly sanded. Once the cradle base 6 and ABS sheet 1 are prepared the two components are bonded together using a marine grade epoxy 10 such as West System® 105 Resin and 205 Hardener, manufactured by Gougeon Brothers, Inc. of Bay City, Mich., United States. This epoxy has been selected for its relatively neutral alkali rating that is appropriate for bonding an art surface, keeping in mind that acidic epoxies will break down the pigments in paint. The West System epoxy also has excellent thin-film characteristics and selflevels out, making it easier to bond the cradle base 6 of polyester, metal, wood or other to the ABS plastic surface 5. Other makes of epoxy having the characteristics and performance of the West System epoxy will also work.

After mixing the resin with the hardener the epoxy 10 is applied onto the flame oxidized bonding surface 5 of ABS sheet 1 and the cradle base 6 positioned and mounted onto sheet 1 within the 9 to 12 minute pot life of the epoxy. Once both pieces are positioned together they may be clamped or secured by other means to hold the two pieces tightly together until the epoxy sets.

Once the ABS Sheet and cradle base assembly have set for 24 hours the excess epoxy 10 may be sanded from the sides of the artist's cradle assembly using a belt sander, block, or other means. During this step the corners of the ABS painting surface 2 may also be beveled to create bevels 11 at approximately 45 degrees to inhibit bubbling and checking of paint along the outside edges when the artist is creating the work on the painted surface 2 side of sheet 1.

After the outside edges have been beveled, the cradle support sides 8 and the edge of the ABS surface 4 may also be sanded where sheet 1 joins the cradle base 6 by first using a medium grit sandpaper block, such as 100 grit, then finish the sanding procedure with a fine sandpaper, such as 220 grit. Following sanding, the painting surface 2 of the artist's cradle should be masked off (if the protective paper and tape have been removed) so that a cosmetic finish may be applied without compromising the painting surface. Any remaining cracks or gaps within the wood cradle bases may be sealed using for example Elmer's interior/exterior wood filler, (which has a PH level of 8.5) then sanded.

The next step for the polyester base, is to apply a finishing paint coat to outside surfaces 4 and 8 of the artist's cradle consisting of 50% white acrylic gesso or 50% polyester color paste such as white mixed with 50% Liquitex™ from, Piscatawawy, N.J., USA, Titanium White artist's acrylic (or similar), with a foam brush for the first coat, and with a foam roller for the second coat approximately six hours after the first. The wood base cradle must be sealed first using Golden Soft gel (Matte) to prevent leaching of any lignens from the wood into artist-applied paint. The painted ABS cradle panel is allowed to dry overnight before removing the protective paper and tape. Finally the ridges of the gesso/white acrylic mixture that have built up along the beveled edges where the surface has been taped off are sanded using 220-grit sandpaper.

In one embodiment a polyester cradle base may be cast using a mold formed by creating a mold master using standard hardboard cut out to the desired shape and applying typically 12 inch or larger square wood strips to the sides or other cradle base locations as needed. The wooden strips are lightly sanded and bonded to the hardboard using LePages #7 Contact Cement (or similar). Any gaps are filled using wood filler surfacing putty, and after drying the putty the master is sanded and sealed using paraffin wax. The master is then secured into a mold tray and coated with a non-silicone mold release. The cradle base frame mold can then be formed using a product such as Synair's Por-A-Mold 2030 after mixing and degassing.

A wooden cradle base can be piece wise prepared in advance and then applied piece by piece to the ABS sheet following the aforementioned method, or pre-assembled by finger jointing or other standard woodworking techniques and then applied as a unit to the ABS sheet. Similarly a metal cradle base may be prepared in advance using a number of metal profiles and metal working techniques to create a structurally rigid frame that may be applied to the ABS cradle panel as above. Likewise other materials may also be used for the cradle base.

By bonding a structurally stable frame or cradle base to the back of a sheet of ABS to form a ABS cradle panel one can create an artist's surface which will maintain its integrity for a much longer period of time than conventional surfaces made of cellulose-based materials when influenced by flexure due to handling, and humidity changes due to environmental changes.

For use with graphite, once a graphite drawing has been applied to the paintable surface of the sheet, a clear finishing coat may be applied, leaving a photograph-like appearance. The ABS sheet according to the present invention also allows for the use of more diluted acrylics to give a translucent appearance, allowing also airbrushing etc.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An artist's cradle comprising:
   a sheet of rigid plastic having a paintable surface on at least one planar surface thereof and a substantially neutral or neutral alkali ph and treated with a heat treatment around at least a periphery of said sheet, wherein said heat treatment includes heat oxidizing said periphery using a heat source, and wherein said periphery is on a surface of said sheet opposite from a surface to be painted of said at least one planar surface,
   a rigid frame bonded by an adhesive to said periphery of said sheet following said heat treatment.

2. The device of claim 1 wherein said sheet is made of ABS.

3. The device of claim 2 wherein said sheet has first and second opposite working surfaces, and wherein said first working surface is smooth and said second working surface is a textured surface.

4. The device of claim 3 wherein said textured surface has a hair cell textured finish.

5. The device of claim 2 wherein said adhesive is a substantially neutral ph epoxy and wherein said periphery is sanded before said heat treatment.

6. The device of claim 5 wherein said frame and said epoxy have a substantially neutral alkali ph.

7. The device of claim 2 wherein said frame is made of wood and wherein said wood is coated so as to be substantially hydroscopic.

8. The device of claim 7 wherein said wood is straight grained.

9. The device of claim 8 wherein said wood is hemlock.

10. The device of claim 2 wherein said frame is moulded.

11. The device of claim 10 wherein said frame is polyester.

12. The device of claim 2 wherein said sheet has a uniform thickness in a thickness range of ⅛ inch to ¼ inch.

13. The device of claim 2 wherein said frame is metal.

14. The device of claim 2 wherein said frame is recessed in from a circumferential edge around an outer circumference around said sheet so as to recess said frame from said circumferential edge of said sheet.

15. The device of claim 1 wherein said paintable surface is also adapted for having graphite drawings applied thereon.

16. A method of making an artist's cradle comprising the steps of:

a) providing a sheet of rigid ABS plastic having a paintable surface on at least one planar surface thereof and a substantially neutral or neutral alkali ph, b) treating with a beat treatment at least a periphery of said sheet, wherein said heat treatment includes heat oxidizing said periphery using a heat source, and wherein said periphery is on a surface of said sheet opposite from a surface to be painted of said at least one planar surface, c) bonding a rigid frame by an adhesive to said periphery of said sheet following said heat treatment.

17. The method of claim 16 wherein said sheet has first and second opposite working surfaces, and wherein said method includes the step of providing that said first working surface is smooth and said second working surface is a textured surface.

18. The method of claim 16 wherein said adhesive is a substantially neutral ph epoxy and further comprising the step of sanding said periphery before said heat treatment.

19. The method of claim 16 wherein said frame is substantially hydroscopic.

20. The method of claim 16 wherein said frame and said epoxy have a substantially neutral alkali ph.

21. The method of claim 16 further comprising the step of recessing said frame in from a circumferential edge around an outer circumference around said sheet.

* * * * *